Figure 1:
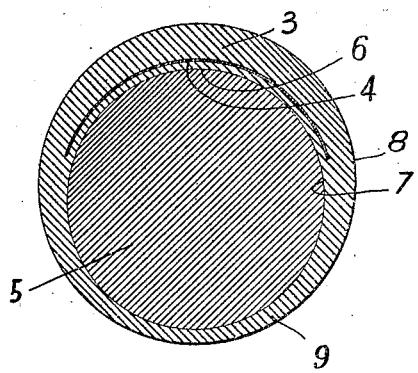

I. J. WEBSTER.
PNEUMATIC TIRE.
APPLICATION FILED FEB. 8, 1913.

1,158,604.

Patented Nov. 2, 1915.

Witnesses.
Fred S. Greenleaf
Joseph D. Ashe

Inventor.
Ira J. Webster.
by Edwards Hard & Smith
Att'ys.

UNITED STATES PATENT OFFICE

IRA J. WEBSTER, OF HAVERHILL, MASSACHUSETTS, ASSIGNOR TO RELIANCE A. C. COMPANY, INC., OF NEW YORK, N. Y., A CORPORATION OF NEW YORK.

PNEUMATIC TIRE.

1,158,604.  Specification of Letters Patent.  Patented Nov. 2, 1915.

Application filed February 8, 1913. Serial No. 747,033.

*To all whom it may concern:*

Be it known that I, IRA J. WEBSTER, a citizen of the United States, residing at Haverhill, county of Essex, State of Massachusetts, have invented an Improvement in Pneumatic Tires, of which the following description, in connection with the accompanying drawing, is a specification, like characters on the drawing representing like parts.

This invention relates to pneumatic tires of that type in which the rubber at the tread portion of the tire is held under a severe compression when the tire is inflated so that if a puncture occurs the severe compression under which the tread is held will immediately close up the puncture and prevent the escape of air. In United States Patent No. 981,208, granted to James MacDonnell on January 10, 1911, an inner tube for a pneumatic tire having the above-described features is shown. In the tire shown in this patent the rubber of the tread portion is held in its compressed condition by a stay-strip which is applied to the tread portion of the tire during the manufacture thereof and which is constructed so as to prevent any transverse expansion. This stay-strip in the patented device is on the exterior of the inner tube and consequently when the tire is used it comes in contact with the inner face of the shoe. I find that this is a detriment because during use there is apt to be a slight movement between the inner face of the shoe and the inner tube which results in wearing and consequently weakening the stay piece. Such wearing or weakening if allowed to proceed will cause the stay strip to lose its strength thereby permitting the rubber to expand to such an extent to prevent it from automatically closing up a puncture. In order to prevent this I have provided a construction wherein the stay-strip is protected from being worn by contact with the shoe.

My invention also provides a novel construction which eliminates any weakness at the sides of the inner tube adjacent the edge of the stay-strip, and otherwise improves pneumatic tires of the above nature, all as will be more fully hereinafter described and then pointed out in the appended claims.

Figure 2:
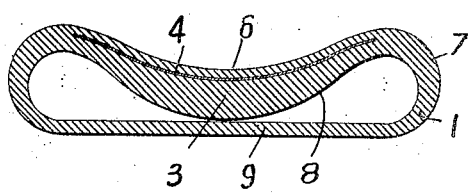
Figure 3:
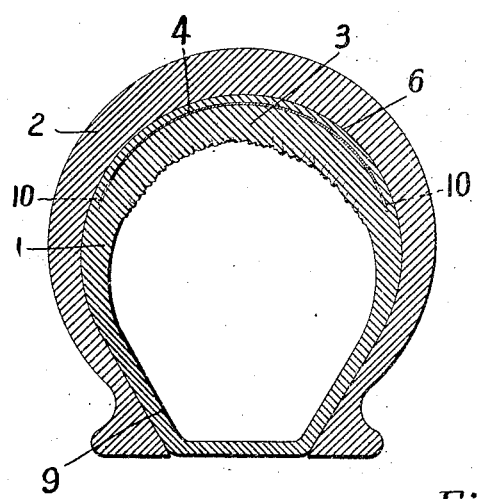
Figure 4:
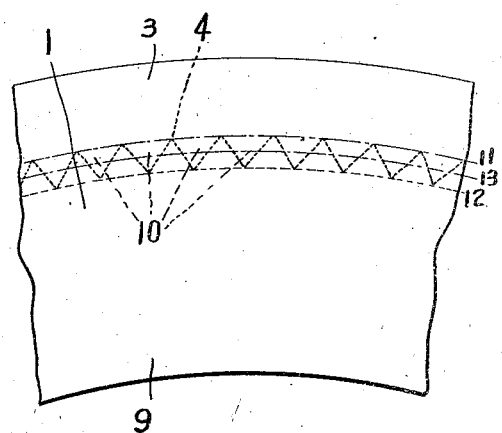
Figure 5:
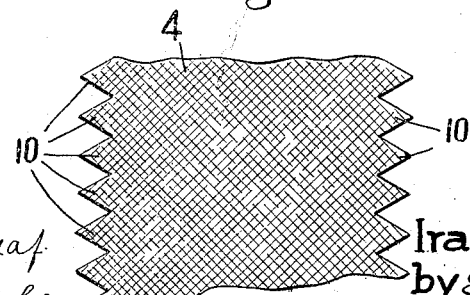

Referring to the drawings wherein I have illustrated the preferred embodiment of my invention, Figure 1 is a cross-sectional view showing one of the first steps in the manufacture of my improved tire; Fig. 2 is a cross-sectional view showing the tire after having been removed from the core and being turned right side out; Fig. 3 is a cross-sectional view showing the inner tube inflated and in position within the outer shoe; Fig. 4 is a side view of a portion of the inner tube inflated; Fig. 5 is a view showing the form of stay-strip which I prefer to employ.

As stated above my invention is particularly applicable to inner tubes and in Fig. 3 I have shown at 1 an inner tube embodying my invention which is situated within an outer shoe or casing 2. In my improved inner tube the rubber of the tread portion 3 is held under severe compression in a transverse direction by means of a stay-strip 4 which is incorporated in the inner tube. In making the inner tube I propose to make it wrong side out on a mandrel 5, as shown in Fig. 1, said inner tube being made with the thickened tread portion 3.

In making the tire I employ a stay-strip 4 of canvas or other similar material and embed this stay-strip in the tread portion of the tire adjacent the mandrel in such a way as to leave a small amount of rubber 6 between the stay-strip and the mandrel. I propose to make the inner tube in sections, each of which is of sufficient length so that by cementing together the ends thereof a complete inner tube can be formed and the stay-strip 4 for each inner tube extends the full length of the section or length from which the inner tube is made. When the tire is made as shown in Fig. 1, the rubber comprising the inner tube and the stay-strip 4 are in their normal condition and are not under internal strain. After a section of inner tube has been properly made and vulcanized the core 5 is removed and then this section of tire is turned inside out in a manner similar to that in which a stocking is turned inside out. This turning of the inner tube section inside out brings the face 7 which is on the interior of the tube in Fig. 1 on the exterior thereof and brings the face 8 which is on the exterior of the tube in Fig. 1 on the interior thereof as shown in Fig. 2. The stay-strip 4 is incapable of stretching in a transverse direction, and this turning of the tube inside out results in subjecting the rubber 3 of the tread to a considerable compression, as will be obvious. When the tube is first turned inside out it will have the cross-sectional shape shown in Fig. 2, but when it is inflated, as shown in Fig. 3, then the bringing of it into this shape will increase the compression transversely under which the rubber of the tread 3 is held. I should here remark that after turning inside out the section of tubing from which an inner tube is to be made the ends of the section are jointed together in some suitable way so as to make the complete inner tube.

By incorporating the stay-strip 4 in the rubber and providing the layer 6 of rubber on the exterior of the stay-strip, it will be seen that when the inner tube is inserted into the shoe 2 the stay-strip will not have any contact with the inner face of the shoe and will not, therefore, be weakened by wear.

In making my inner tube I propose to make the stay-strip of such a width that the edges of the stay-strip come at about the sides of the inner tube when the latter is inflated, as clearly seen in the drawings. While it is important that the tread surface of the inner tube should not expand but should be held under compression, it is desirable that the inner portion 9 of the inner tube should be capable of expanding in order to permit the inner tube to completely fill the shoe when the tire is inflated and also to permit cross-sectional expansion of the tire as a whole. My inner tube, therefore, is one having a thickened tread and provided with a stay-strip covering the portion of the tread exposed to puncture and holding such portion in compression, said inner tube having the integral part thereof between the edges of the stay-strip unrestrained or unstayed to permit cross-sectional expansion of the tire.

I have found from experiment that where the stay-strip 4 has a straight edge the inner tube is apt to break first at the edge of the stay-strip. This is partly because when the stay strip is thus made with a straight edge the abrupt change from the stayed to the unstayed portion of the rubber produces such a condition that when the tube is inflated the greater expansion of the unstayed portion of the rubber tends to take place immediately at the point of junction between the stayed and unstayed portions or at the edge of the stay-strip, and when there is thus a greater expansion at this point the strength of the inner tube is correspondingly weakened at such point. Moreover, when the tire is in use the weight of the automobile tends to flatten that portion of it which rests on the ground and this flattening tends to cause an outward bulge at the sides of the tire. This outward thrust or bulge takes place at the point where the stayed and unstayed portions of the inner tube join and thus a greater strain is put on this portion of the inner tube. Moreover, this continual flattening of the tire causes more or less wear between the shoe and the inner tube at the sides of the latter, which wear would come at substantially the line of junction between the stayed and unstayed portions of the inner tube. The occurrence of such wear tends to still further weaken the inner tube at this point. In order to overcome this objection and to provide an inner tube which will be free therefrom I propose to make the stay-strip with edges having gradually or progressively-increased staying properties so that there will be a gradual blending from the stayed to the unstayed portion of the tire. One construction of stay-strip having these qualities is shown in Figs. 4 and 5 wherein the edge of the stay-strip is serrated and provided with the tapering projections 10. With a construction like this the stay-strip will have its maximum staying qualities along the line 11 and its minimum staying qualities along the line 12 in Fig. 4, and at intermediate points the stay-strip will have progressively-increased staying properties from the line 12 to the line 11. If, therefore, in the manufacture of the tire there is a weak spot in the rubber along some intermediate line, such as the line 13, the projections 10 will reinforce the rubber at this point sufficiently so that it will not be subjected to an undue strain sufficient to cause a rupture. This construction whereby there is a gradual change from the stayed to the unstayed portion of the tire makes a construction which is free from the objections above noted and which gives excellent satisfaction in use.

My invention, of course, is not limited to the particular shape of stay-strip herein illustrated as any construction which will give this gradual blending from the stayed to the unstayed portion of the tire would come within my invention.

I will preferably use a stay-strip which is cut on the bias, as shown in Fig. 5.

Having fully described my invention, what I claim as new and desire to secure by Letters Patent is:—

1. An inner tube for a pneumatic tire having a thickened tread portion of rubber which is highly compressed in a transverse direction and a stay-strip associated with said tread portion and operating to hold the rubber under this high degree of compression, the edges of the stay-strip being serrated thereby to provide a zone between the stayed and the unstayed portion of the inner tube in which the staying effect is progressively varying.

2. An inner tube for a pneumatic tire having a thickened stayed tread portion in which the rubber is held under a high degree of compression in a transverse direction, an unstayed portion opposite the tread portion, and an intermediate portion on each side of the tire between the stayed and the unstayed portions, which intermediate portion is provided with staying means having a progressively-increased staying effect from the unstayed to the stayed portion.

In testimony whereof, I have signed my name to this specification, in the presence of two subscribing witnesses.

IRA J. WEBSTER.

Witnesses:
 LOUIS C. SMITH,
 BERTHA F. HEUSEF